US011204520B2

(12) United States Patent
Lee et al.

(10) Patent No.: US 11,204,520 B2
(45) Date of Patent: Dec. 21, 2021

(54) POLARIZING PLATE FOR LIGHT-EMITTING DISPLAY DEVICE, AND LIGHT-EMITTING DISPLAY DEVICE INCLUDING SAME

(71) Applicant: SAMSUNG SDI CO., LTD., Yongin-si (KR)

(72) Inventors: Sang Hum Lee, Suwon-si (KR); Kenji Hamada, Suwon-si (KR); Jin Sook Kim, Suwon-si (KR); Jung Hun You, Suwon-si (KR); Jin Hee Choi, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/756,426

(22) PCT Filed: Oct. 10, 2018

(86) PCT No.: PCT/KR2018/011882
§ 371 (c)(1),
(2) Date: Apr. 15, 2020

(87) PCT Pub. No.: WO2019/112163
PCT Pub. Date: Jun. 13, 2019

(65) Prior Publication Data
US 2020/0333520 A1    Oct. 22, 2020

(30) Foreign Application Priority Data
Dec. 4, 2017 (KR) .......................... 10-2017-0165484

(51) Int. Cl.
*G02F 1/1335* (2006.01)
*G02F 1/13363* (2006.01)

(52) U.S. Cl.
CPC .... *G02F 1/133528* (2013.01); *G02F 1/13363* (2013.01); *G02F 1/133634* (2013.01); *G02F 1/133541* (2021.01); *G02F 2201/38* (2013.01)

(58) Field of Classification Search
CPC ... G02F 1/133528; G02F 2001/133541; G02F 1/13363; G02F 1/133541; G02F 1/133634; G02B 5/3025; G02B 5/3083
See application file for complete search history.

(56) References Cited

U.S. PATENT DOCUMENTS

2008/0252974 A1* 10/2008 Futamura .......... G02F 1/133528
                                                        359/487.06
2010/0231836 A1*  9/2010 Moriya ................ G02B 5/3083
                                                        349/118
(Continued)

FOREIGN PATENT DOCUMENTS

CN    102262256 A    11/2011
CN    104813202 A     7/2015
(Continued)

OTHER PUBLICATIONS

Chinese Intellectual Property Office Action dated Jul. 9, 2021, and accompanying Search Report dated Jul. 1, 2021, for Corresponding Chinese Patent Application No. 201880078219.X, 8 pages.

*Primary Examiner* — Jia X Pan
(74) *Attorney, Agent, or Firm* — Lewis Roca Rothgerber Christie LLP

(57) ABSTRACT

Provided is a polarizing plate for a light-emitting diode and a light-emitting display device including the same, the polarizing plate comprising a polarizing film and a liquid crystal retardation film, wherein the liquid crystal retardation film comprises a laminate made of: a second retardation film having a discotic liquid crystal of which an in-plane retardation Re, in a wavelength of 550 nm, is approximately 220 nm to approximately 280 nm and a biaxial degree (NZ)

(Continued)

is approximately 0 to approximately 0.3; and a first retardation film having a nematic liquid crystal of which an in-plane retardation Re, in a wavelength of 550 nm, is approximately 100 nm to approximately 150 nm and a biaxial degree (NZ) is approximately 0.3 to approximately 0.7.

12 Claims, 1 Drawing Sheet

(56) References Cited

U.S. PATENT DOCUMENTS

| | | | | |
|---|---|---|---|---|
| 2012/0003400 | A1* | 1/2012 | Nishimura | B32B 27/288 428/1.1 |
| 2013/0301129 | A1* | 11/2013 | In | B29D 11/00788 359/492.01 |
| 2014/0247487 | A1* | 9/2014 | Jeon | G02F 1/133634 359/489.07 |
| 2015/0212246 | A1* | 7/2015 | Yoshida | G02B 5/3083 349/194 |
| 2015/0293286 | A1* | 10/2015 | Jeon | G02B 5/3083 359/489.07 |
| 2016/0011352 | A1* | 1/2016 | Saitoh | G02B 5/3016 257/98 |
| 2016/0025913 | A1* | 1/2016 | Oh | G02B 5/3083 359/487.02 |
| 2018/0149785 | A1* | 5/2018 | Lee | G02F 1/133305 |
| 2018/0159085 | A1* | 6/2018 | Yoshida | H01L 27/323 |
| 2019/0353956 | A1* | 11/2019 | Yanai | H05B 33/02 |
| 2019/0391390 | A1* | 12/2019 | Tanaka | G02B 5/3016 |

FOREIGN PATENT DOCUMENTS

| | | |
|---|---|---|
| CN | 105301688 A | 2/2016 |
| JP | 2008-107687 A | 5/2008 |
| JP | 4276392 B2 | 6/2009 |
| JP | 2014-32270 A | 2/2014 |
| JP | 2015-129970 A | 7/2015 |
| JP | 2017-10034 A | 1/2017 |
| KR | 10-0720346 B1 | 5/2007 |
| KR | 10-2016-0012274 A | 2/2016 |

* cited by examiner

[FIG. 1]
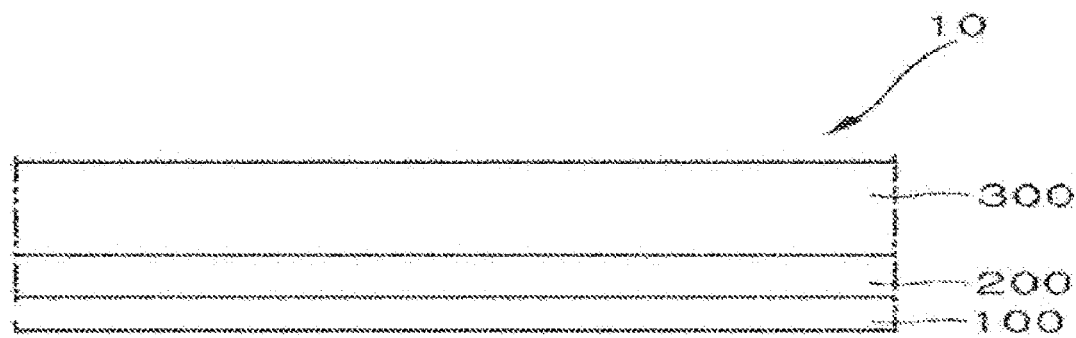
[FIG. 2]
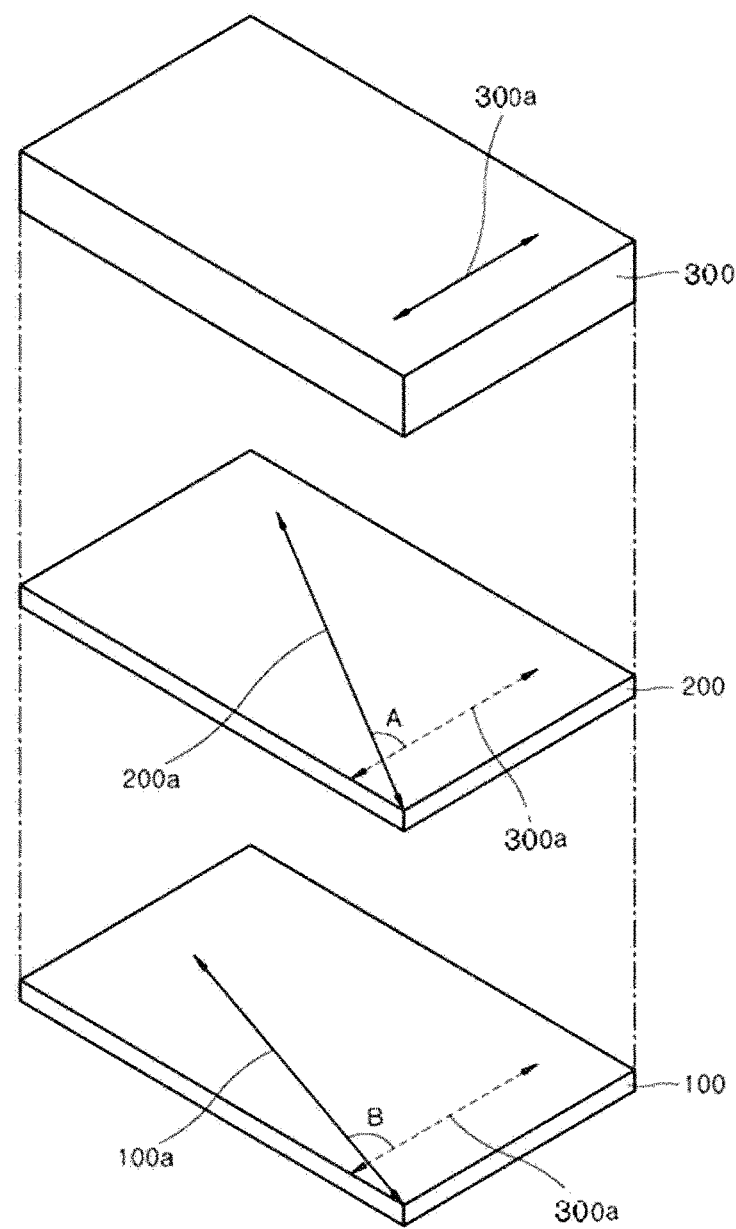

POLARIZING PLATE FOR LIGHT-EMITTING DISPLAY DEVICE, AND LIGHT-EMITTING DISPLAY DEVICE INCLUDING SAME

CROSS-REFERENCE TO RELATED APPLICATIONS

This application is a U.S. National Phase Patent Application of International Application Number PCT/KR2018/011882, filed on Oct. 10, 2018, which claims priority to Korean Patent Application Number 10-2017-0165484, filed on Dec. 4, 2017, the entire contents of both of which are incorporated herein by reference.

TECHNICAL FIELD

The present invention relates to a polarizing plate for light emitting display devices and a light emitting display device including the same.

BACKGROUND ART

An organic light emitting display includes a polarizing plate including a polarizing film and a retardation layer to improve visibility by preventing external light having entered an organic light emitting device from escaping therefrom through linear polarization and circular polarization of the external light. In recent years, the retardation layer includes a liquid crystal layer to achieve reduction in thickness of the polarizing plate.

Although the retardation layer may include one liquid crystal layer alone, the retardation layer may include two liquid crystal layers having different indexes of refraction to provide better effects. One of the two liquid crystal layers has ½ in-plane retardation and the other liquid crystal layer has ¼ in-plane retardation. However, there is a limitation in reduction of reflectivity only through adjustment of the in-plane retardation of the two liquid crystal layers. Conventionally, there is a limitation in simultaneous reduction in both side reflectivity and front reflectivity, despite reduction in front reflectivity.

On the other hand, the liquid crystal layer is generally provided with an alignment film to exhibit phase retardation. However, since the retardation of the liquid crystal layer including the alignment film depends only on the alignment film, there is a limitation in implementation of a target retardation and NZ coefficient, thereby making it difficult to achieve sufficient reduction in reflectivity when the polarizing plate including the crystal layer is applied to a display device.

The background technique of the present invention is disclosed in Japanese Unexamined Patent Publication No. 2014-032270.

DISCLOSURE

Technical Problem

It is one aspect of the present invention to provide a polarizing plate for light emitting display devices, which can reduce both front reflectivity and side reflectivity.

It is another aspect of the present invention to provide a polarizing plate for light emitting display devices, which can reduce side color shift.

It is a further aspect of the present invention to provide a polarizing plate for light emitting display devices, which can minimize a difference between front reflectivity and side reflectivity.

It is yet another aspect of the present invention to provide a light emitting display device including the polarizing plate for light emitting display devices according to the present invention.

Technical Solution

In accordance with one aspect of the present invention, a polarizing plate for light emitting display devices includes a polarizing film and a liquid crystal retardation film formed on one surface of the polarizing film, wherein the liquid crystal retardation film may include a laminate of a second retardation film having an in-plane retardation Re of about 220 nm to about 280 nm and a degree of biaxiality NZ of about 0 to about 0.3 at a wavelength of 550 nm and including discotic liquid crystals and a first retardation film having an in-plane retardation Re of about 100 nm to about 150 nm and a degree of biaxiality NZ of about 0.3 to about 0.7 at a wavelength of 550 nm and including nematic liquid crystals.

In accordance with another aspect of the present invention, a light emitting display device includes the polarizing plate for light emitting display devices according to the present invention.

Advantageous Effects

The present invention provides a polarizing plate for light emitting display devices, which can reduce both front reflectivity and side reflectivity.

The present invention provides a polarizing plate for light emitting display devices, which can reduce side color shift.

The present invention provides a polarizing plate for light emitting display devices, which can minimize a difference between front reflectivity and side reflectivity.

The present invention provides a light emitting display device including the polarizing plate for light emitting display devices according to the present invention.

DRAWINGS

FIG. 1 is a sectional view of a polarizing plate for light emitting display devices according to one embodiment of the present invention.

FIG. 2 shows angles between an absorption axis of a polarizing film, a fast axis of a second retardation film, and a fast axis of a first retardation film in the polarizing plate for light emitting display devices according to the embodiment of the present invention.

BEST MODE

Embodiments of the present invention will be described in detail with reference to the accompanying drawings such that the present invention can be easily implemented by those skilled in the art. It should be understood that the present invention may be embodied in different ways and is not limited to the following embodiments. In the drawings, portions irrelevant to the description will be omitted for clarity. Like components will be denoted by like reference numerals throughout the specification.

As used herein, spatially relative terms such as "upper" and "lower" are defined with reference to the accompanying drawings. Thus, it will be understood that "upper" can be used interchangeably with "lower".

Herein, "in-plane retardation Re", "out-of-plane retardation Rth", and "degree of biaxiality NZ" are represented by Equations 1, 2 and 3, respectively, and are measured at a wavelength of 550 nm:

$$Re = (nx-ny) \times d \quad [21] \qquad \text{<Equation 1>}$$

$$Rth = ((nx+ny)/2 - nz) \times d \qquad \text{<Equation 2>}$$

$$NZ = (nx-nz)/(nx-ny) \qquad \text{<Equation 3>}$$

(where nx, ny, and nz are indexes of refraction of a retardation layer at a wavelength of 550 nm in the x-axis, y-axis and z-axis directions, respectively, and d is the thickness of the retardation layer (unit: nm)).

Herein, "side" refers to a region in which θ ranges from 0° to 60° in the spherical coordinate system represented by (φ, θ) in which the front is indicated by (0°, 0°), a left end point is indicated by (180°, 90°), and a right end point is indicated by (0°, 90°) with reference to the horizontal direction.

Hereinafter, a polarizing plate according to one embodiment of the present invention will be described with reference to FIG. 1.

Referring to FIG. 1, a polarizing plate 10 may include a polarizing film 300, a second retardation film 200, and a first retardation film 100. The second retardation film 200 and the polarizing film 300 are sequentially formed on one surface of the first retardation film 100. Although not shown in FIG. 1, an adhesive layer may be further formed on the other surface of the first retardation film 100 to mount the polarizing plate on a light emitting display panel (for example, organic light emitting display panel).

The first retardation film 100 may have an in-plane retardation Re of about 100 nm to about 150 nm at a wavelength of 550 nm and the second retardation film 200 may have an in-plane retardation Re of about 220 nm to about 280 nm at a wavelength of 550 nm.

According to the present invention, the first retardation film 100 may include nematic liquid crystals having a degree of biaxiality NZ of about 0.3 to about 0.7 at a wavelength of 550 nm, and the second retardation film 200 may include discotic liquid crystals having a degree of biaxiality NZ of about 0 to about 0.3 at a wavelength of 550 nm. The polarizing plate according to the present invention can reduce both front reflectivity and side reflectivity at the same time while suppressing color shift and minimizing a difference between the front reflectivity and the side reflectivity by adjusting not only the in-plane retardation of the first retardation film and the second retardation film but also the degree of biaxiality thereof. There is a limitation in reduction of the side reflectivity and the front reflectivity only through adjustment of the in-plane retardation of the first retardation film and the second retardation film. In one embodiment, the polarizing plate may have a front reflectivity of about 0.5% or less, a side reflectivity of about 1% or less, preferably about 0.8% or less, a side color shift of about 5 or less, preferably less than about 3.7 (as measured with reference to the SCE). A difference between the front reflectivity and the side reflectivity may be about 0.5% or less.

Hereinafter, each component of the polarizing plate according to the present invention will be described in detail.

First Retardation Film

The first retardation film 100 may have an in-plane retardation Re of about 100 nm to about 150 nm, preferably about 105 nm to about 130 nm, more preferably about 110 nm to about 130 nm, at a wavelength of 550 nm. Within this range, the polarizing plate can reduce side reflectivity.

The first retardation film 100 may have a degree of biaxiality NZ of about 0.3 to about 0.7, preferably about 0.4 to about 0.6. Within this range, the polarizing plate can reduce side reflectivity and front reflectivity while suppressing color shift and minimizing a difference between the side reflectivity and the front reflectivity.

The first retardation film 100 may include an alignment layer-free nematic liquid crystal layer. When the first retardation film 100 includes another liquid crystal layer, for example, a discotic liquid crystal layer, other than the nematic crystal layer, there can be a problem of deterioration in compatibility with a panel.

Nematic liquid crystals generally have a degree of biaxiality of about 1.0. However, according to the present invention, in order to achieve the in-plane retardation and the degree of biaxiality within the above ranges of the present invention, photoreactive liquid crystals having a photosensitive functional group described below are used and the first retardation film 100 including the nematic liquid crystal layer is formed without the alignment layer by the method described below.

Even without the alignment layer, the nematic liquid crystal layer can exhibit the in-plane retardation and the degree of biaxiality within the above ranges. The first retardation film 100 can exhibit the in-plane retardation and the degree of biaxiality within the above ranges through alignment of liquid crystals without the alignment layer.

The nematic liquid crystal layer is composed of a crosslinked product of the photoreactive liquid crystals having a photosensitive functional group.

The liquid crystals may include a liquid crystalline polymer including a unit composed of a mesogen forming group and a photosensitive functional group. The liquid crystalline polymer may have the unit composed of the mesogen forming group and the photosensitive functional group at a main chain or a side chain thereof. Preferably, the liquid crystalline polymer may include the unit having the mesogen forming group and the photosensitive functional group at the side chain through polymerization of monomers having polymerization groups to the mesogen forming group and the photosensitive functional group. The polymerization groups may include an acryloyl group, a methacryloyl group, an epoxy group, a vinyl ether group, and the like.

The mesogen forming group may be selected from any mesogen forming groups capable of imparting liquid crystallinity to the liquid crystalline polymer, without being particularly limited. The mesogen forming group may include not only a mesogen group, but also a hydrogen-bonded mesogen group that exhibits liquid crystallinity through hydrogen bonding between molecules.

The mesogen group may be an —Ar1-Y-Ar2-group (where Ar1 and Ar2 are each independently a substituted or unsubstituted $C_6$ to $C_{20}$ arylene group or a substituted or unsubstituted $C_4$ to $C_{20}$ hetero-arylene group; and Y is a single bond, a $C_1$ to $C_3$ alkylene group, —CH=CH—, —C≡C—, —O—, —N=N—, —COO—, —OCO—, —CH=N—, or a $C_6$ to $C_{10}$ arylene group). Ar1 and Ar2 may be placed at any positions without limitation so long as the mesogen group can impart liquid crystallinity. When Ar1 and Ar2 are phenylene groups, Ar1 and Ar2 may be placed at the para-positions, and when Ar1 and Ar2 are naphthalene groups, Ar1 and Ar2 may be placed at the 2,6-positions.

The photosensitive functional group is a functional group capable of being crosslinked by photo-energy, for example, a cinnamoyl group, a cinnamylidene group, a (meth)acryloyl group, a (meth)acryloyl group-containing group, a coumarin group, a benzophenone group, or the like. The (meth)acryloyl group-containing group may be a furyl (meth)acryloyl group, a biphenyl (meth)acryloyl group, or a naphthyl (meth)acryloyl group.

In the unit, the mesogen forming group and the photosensitive functional group may be bonded to each other directly or through a connection group. The connection group may include a $C_1$ to $C_{10}$ alkylene group, —O—, —S—, —SO—, —SO$_2$—, —CH=CH—, —C≡C—, —N=N—, —COO—, —OCO—, or a $C_6$ to $C_{10}$ arylene group. These connection groups may be used alone or in combination thereof.

In one embodiment, the unit may be bonded to the side chain of the liquid crystalline polymer and may be represented by Formula 1 or Formula 2:

<Formula 1>

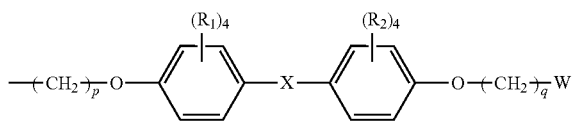

(where p is an integer from 1 to 12; q is an integer from 0 to 12; X is a single bond, a $C_1$ to $C_{10}$ alkylene group, —O—, —S—, —SO—, —SO$_2$—, —CH=CH—, —C≡C—, —N=N—, —COO—, —OCO—, or a $C_6$ to $C_{10}$ arylene group; $R_1$ and $R_2$ are each independently a hydrogen atom, a $C_1$ to $C_{10}$ alkyl group, a $C_1$ to $C_{10}$ alkoxy group, a $C_2$ to $C_{10}$ alkenyl group, a $C_2$ to $C_{10}$ alkynyl group, or a halogen atom; and W is a cinnamoyl group, a cinnamylidene group, a (meth)acryloyl group, a (meth)acryloyl group-containing group, a coumarin group, or a benzophenone group).

<Formula 2>

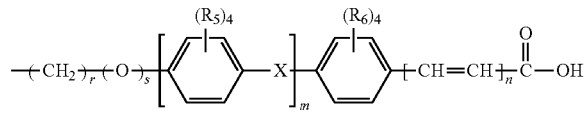

(where r is an integer from 0 to 12; s is 0 or 1; m is 0 or 1; n is an integer from 1 to 3; X is a single bond, a $C_1$ to $C_{10}$ alkylene group, —O—, —S—, —SO—, —SO$_2$—, —CH=CH—, —C≡C—, —N=N—, —COO—, —OCO—, or a $C_6$ to $C_{10}$ arylene group; and $R_5$ and $R_6$ are each independently a hydrogen atom, a $C_1$ to $C_{10}$ alkyl group, a $C_1$ to $C_{10}$ alkoxy group, a $C_2$ to $C_{10}$ alkenyl group, a $C_2$ to $C_{10}$ alkynyl group, or a halogen atom).

In Formula 1, $R_{1S}$ in the same benzene group may be identical to or different from each other. In Formula 1, $R_{2S}$ in the same benzene group may be identical to or different from each other. In Formula 2, R5S in the same benzene group may be identical to or different from each other. In Formula 2, R6S in the same benzene group may be identical to or different from each other.

The liquid crystalline polymer may further include a unit free from the photosensitive functional group and containing the mesogen forming group. Specifically, the unit may be represented by Formula 3:

<Formula 3>

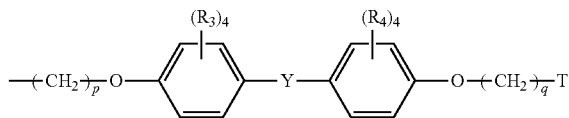

(where p is an integer from 1 to 12; q is an integer from 0 to 12; Y is a single bond, a $C_1$ to $C_{10}$ alkylene group, —O—, —S—, —SO—, —SO$_2$—, —CH=CH—, —C≡C—, —N=N—, —COO—, —OCO—, or a $C_6$ to $C_{10}$ arylene group; $R_3$ and $R_4$ are each independently a hydrogen atom, a $C_1$ to $C_{10}$ alkyl group, a $C_1$ to $C_{10}$ alkoxy group, a $C_2$ to $C_{10}$ alkenyl group, a $C_2$ to $C_{10}$ alkynyl group, or a halogen atom; and T is a hydrogen atom, a hydroxyl group, a cyano group, a $C_1$ to $C_{10}$ alkyl group, a $C_2$ to $C_{10}$ alkenyl group, a $C_2$ to $C_{10}$ alkynyl group, a $C_1$ to $C_{10}$ alkoxy group, a halogen atom, or a $C_1$ to $C_{10}$ halo-alkyl group).

In Formula 3, $R_{3S}$ in the same benzene group may be identical to or different from each other. In Formula 3, $R_{4S}$ in the same benzene group may be identical to or different from each other.

The nematic liquid crystal layer may be formed of photosensitive functional group-containing photoreactive liquid crystals or a composition including the photosensitive functional group-containing photoreactive liquid crystals. Here, the degree of biaxiality (NZ) of the polarizing plate according to the present invention may be achieved through adjustment of a boiling point or drying conditions of a solvent used in formation of the liquid crystal layer, for example, a drying temperature of the solvent, an air velocity for volatilization of the solvent, and the like.

The first retardation film 100 may be manufactured by depositing a composition for the first retardation film including the photosensitive functional group-containing photoreactive liquid crystals on a base film, drying the composition, and irradiating the dried composition with polarized UV light, followed by drying and cooling the resulting product. Then, alignment of liquid crystals may be further secured after heating.

The base film may include a second retardation film or a typical release film. The base film may be subjected to plasma treatment or corona treatment before deposition of the composition for the first retardation film thereon. Plasma treatment or corona treatment may be performed by a typical method known to those skilled in the art. For example, plasma treatment or corona treatment may be performed at a total of about 160 dose under conditions of a total of once to 10 times at about 20 dose to about 80 dose. Within this range, the first retardation film can be efficiently formed without affecting retardation of the second retardation film 200.

The composition for the first retardation film may include photoreactive liquid crystals having a photosensitive functional group, and a solvent. The composition may further include typical additives.

The solvent may include at least one first solvent having a boiling point of about 40° C. to about 90° C., preferably about 50° C. to about 85° C. Within this range of boiling point, the solvent can be volatilized during formation of the liquid crystal layer, thereby realizing the degree of biaxiality and in-plane retardation of the liquid crystal layer according to the present invention. For example, the first solvent may include at least one selected from the group of tetrahydrofuran (THF) and dimethoxy ethane (DME), without being limited thereto.

In addition to the first solvent, the solvent may further include a second solvent having a boiling point of about 100° C. to about 190° C., preferably about 110° C. to about 190° C., more preferably about 110° C. to about 130° C. The second solvent has a higher boiling point than the first solvent. Within this range of boiling point, the solvent can be volatilized during formation of the liquid crystal layer, thereby realizing the degree of biaxiality and in-plane retardation of the liquid crystal layer according to the present invention. For example, the second solvent may include at least one selected from the group of ethylene glycol methyl ether (EGM), dimethyl sulfoxide (DMSO), and diethylene glycol dimethyl ether, without being limited thereto.

In one embodiment, for the first retardation film, the composition may include a mixture of the first solvent and the second solvent. Relative to 100 parts by weight of the mixture, the first solvent may be present in an amount of about 55 parts by weight to about 85 parts by weight and the second solvent may be present in an amount of about 15 parts by weight to about 45 parts by weight. More preferably, the first solvent is present in an amount of about 60 parts by weight to about 80 parts by weight and the second solvent is present in an amount of about 20 parts by weight to about 40 parts by weight.

In the composition for the first retardation film, the photoreactive liquid crystals may be present in an amount of about 10 parts by weight to about 50 parts by weight, preferably about 10 parts by weight to about 30 parts by weight, relative to 100 parts by weight of the solvent.

A coating layer is formed by depositing the composition for the first retardation film onto a base film, followed by drying the composition.

The composition for the first retardation film may be deposited by a typical method using, for example, a spin coater, a slit coater, a spray coater, a roll coater, and the like.

Drying may include multiple drying steps performed in different temperature zones. In one embodiment, drying may include a first drying step performed in a first temperature zone and a second drying step performed in a second temperature zone. The first temperature zone may range from about 40° C. to about 120° C., preferably from about 50° C. to about 110° C. The second temperature zone may range from about 110° C. to about 190° C., preferably about 110° C. to about 150° C., more preferably about 125° C. to about 145° C. In this way, the composition for the first retardation film is dried in the different temperature zones so as to secure the degree of biaxiality of the first retardation film by securing a time for side chains of the liquid crystals to be arranged in a direction of an air layer in the first temperature zone while preventing movement of the liquid crystals in the second temperature zone. In the first temperature zone, drying may be performed for about 20 seconds to about 100 seconds, preferably about 40 seconds to about 80 seconds. In the second temperature zone, drying may be performed for about 200 seconds to about 600 seconds, preferably about 300 seconds to about 500 seconds.

During drying, air may be supplied to the coating layer to volatilize the solvent. The air velocity may range from about 5 m/s to about 100 m/s, preferably about 5 m/s to about 50 m/s. Within this range, it is possible to realize the degree of biaxiality and the in-plane retardation within the inventive ranges under the solvent volatilization conditions.

After drying, the coating layer is irradiated with linearly polarized light. As a result, in the deposited composition, only the photosensitive functional groups of the unit irradiated with the linearly polarized light can be crosslinked. Irradiation may be performed using UV light, IR light, or visible light, preferably UV light having a wavelength of about 200 nm to about 500 nm, more preferably about 250 nm to about 400 nm.

After irradiation with light, the coating layer is subjected to heating and cooling. By heating, the mesogen forming group of the unit is aligned in a normal direction of the second retardation film to form the first retardation film in homeotropic alignment. Heating may be performed at about 50° C. to about 150° C., preferably about 60° C. to about 140° C. Cooling may be performed at a cooling rate of about 1° C./min to about 100° C./min, preferably about 1° C./min to about 20° C./min.

In order to fix alignment of the liquid crystals, the coating layer may be further subjected to irradiation with light after heating and cooling. For example, alignment of the liquid crystals may be fixed by irradiation with light having a wavelength of about 200 nm to about 500 nm, more preferably about 250 nm to about 400 nm.

The first retardation film 100 is a retardation layer satisfying refractivity relationship of nx>nz>ny at a wavelength of 550 nm, in which nx ranges from about 1.5 to about 1.6, ny ranges from 1.4 to 1.5, and nz ranges from about 1.5 to about 1.6. Within these ranges, the first retardation film can secure optical compensation effects in a display device.

The first retardation film 100 may have an out-of-plane retardation Rth of about −30 nm to about 30 nm, preferably about −20 nm to about 20 nm, more preferably about −20 nm to about 10 nm, at a wavelength of 550 nm. Within this range, the first retardation film 100 can secure an antireflection effect and reduction in side color shift to improve screen visibility together with the second retardation film 200.

The first retardation film 100 may have a thickness of about 2 μm or less, preferably about 0.5 μm to about 2 μm. Within this range, the polarizing plate can achieve thickness reduction.

The first retardation film 100 is directly formed on the second retardation film 200. Herein, "directly formed on" means that no other adhesive layer, bonding layer or adhesive/bonding layer is formed between the first retardation film 100 and the second retardation film 200.

However, although not shown in FIG. 1, an adhesive layer may be further formed between the first retardation film 100 and the second retardation film 200. Each of the first retardation film 100 and the second retardation film 200 is secured to the adhesive layer. The adhesive layer may be a pressure sensitive adhesive layer, without being limited thereto.

Second Retardation Film

The second retardation film 200 may have an in-plane retardation Re of about 220 nm to about 280 nm, preferably about 230 nm to about 280 nm, at a wavelength of 550 nm. Within this range, the second retardation film can reduce side reflectivity of the polarizing plate.

The second retardation film 200 may have a degree of biaxiality NZ of 0 to 0.3, preferably 0 to 0.2, more preferably 0 to 0.1. Within this range, the polarizing plate can reduce side reflectivity and front reflectivity while suppressing color shift and minimizing a difference between the front reflectivity and the side reflectivity.

The second retardation film 200 may include a discotic liquid crystal layer. When the second retardation film 200 includes liquid crystals, for example, nematic liquid crystals, other than discotic crystals, there can be a problem of increase in side reflectivity. The discotic liquid crystals may have a homeotropic alignment or homogeneous alignment liquid crystal structure.

The degree of biaxiality of the first retardation film 200 at a wavelength of 550 nm is greater than the degree of biaxiality of the second retardation film 100 at a wavelength of 550 nm, and a difference therebetween may range from about 0.2 to about 0.8, preferably from about 0.2 to about 0.7. Within this range, the polarizing plate can reduce side reflectivity and front reflectivity while suppressing color shift and minimizing a difference between the side reflectivity and the front reflectivity. A laminate of the first retardation film and the second retardation film having a difference in degree of biaxiality within the above range can be realized by the present invention.

When the liquid crystals of the second retardation film 200 are not particular liquid crystals allowing control of the degree of biaxiality Nz and optical alignment, it is difficult to control the degree of biaxiality of the second retardation film 200.

In the second retardation film 200, the liquid crystal layer may include liquid crystals that do not allow change of alignment by irradiation with UV light (for example, about 200 nm to about 400 nm). The liquid crystal layer serves to realize phase retardation through an alignment layer, without being limited thereto. The alignment layer may include an alignment layer using a rubbing agent, optical alignment, and the like, without being limited thereto. The rubbing agent may include a typical rubbing agent well-known in the art.

The liquid crystal layer may include liquid crystals free from a photosensitive functional group. As the liquid crystal layer is formed of the liquid crystals free from the photosensitive functional group, alignment of the liquid crystals is not changed by external UV light in use of the polarizing plate, thereby improving reliability and visibility.

The second retardation film 200 may be manufactured by forming an alignment layer on a base film and depositing a composition for the second retardation film on the alignment layer, followed by heating and curing the composition through irradiation with non-polarized UV light. The base film may include an optically transparent resin film typically used in the art. For example, the base film may include a cellulose film including a triacetylcellulose resin, a polyester film, and a polycarbonate film, without being limited thereto.

The second retardation film 200 is a retardation layer satisfying refractivity relationship of nx>nz>ny at a wavelength of 550 nm, in which nx ranges from about 1.55 to about 1.65, ny ranges from 1.45 to 1.55, and nz ranges from about 1.55 to about 1.65. Within these ranges, the second retardation film can secure optical compensation effects in a display device.

The second retardation film 200 may have an out-of-plane retardation Rth of about −90 nm to about −140 nm, preferably about −100 nm to about −130 nm, more preferably about −105 nm to about −125 nm, at a wavelength of 550 nm. Within this range, the second retardation film 200 can secure an antireflection effect to improve screen visibility together with the second retardation film 200.

The second retardation film 200 may have a thickness of about 3 μm or less, preferably about 2 μm or less. Within this range, the polarizing plate can achieve thickness reduction.

An angle defined between the fast axis of the second retardation film 200 and the fast axis of the first retardation film 100 may range from about 55° to about 80°, preferably from about 60° to about 75°, more preferably from about 60° to about 70°. Within this range, the polarizing plate can exhibit a good antireflection effect on both the front surface and the side surface thereof.

The laminate of the first retardation film and the second retardation film may have a thickness of about 1 μm to about 5 μm, preferably about 1 μm to about 3 μm. Within this range, the laminate can be used in a polarizing plate for light emitting display devices.

Polarizing Film

The polarizing film 300 may be stacked on the other surface of the second retardation layer 200.

Although not shown in FIG. 1, the polarizing film 300 may be stacked on the second retardation film 200 via an adhesive layer or a bonding layer. The adhesive layer and the bonding layer may be formed of a typical pressure-sensitive adhesive (PSA), a typical photo-curable adhesive, or a typical thermosetting adhesive, which is known to those skilled in the art, without being limited thereto.

FIG. 2 shows angles between the absorption axis of the polarizing film, the fast axis of the second retardation film, and the fast axis of the first retardation film in the polarizing plate for light emitting display devices according to the embodiment of the present invention. Referring to FIG. 2, the angle between the fast axis 100a of the first retardation film 100 and the absorption angle 300a of the polarizing film 300 may range from about 70° to about 100°, preferably from about 75° to about 95°, more preferably from about 75° to about 85°. Within this range, the polarizing plate can exhibit a good antireflection effect on both the front surface and the side surface thereof. The angle between the fast axis 200a of the second retardation film 200 and the absorption angle 300a of the polarizing film 300 may range from about 100 to about 25°, preferably about 100 to about 20°. Within this range, the polarizing plate can exhibit a good antireflection effect on both the front surface and the side surface thereof.

The polarizing film 300 is formed on the other surface of the second retardation film 200 to provide the antireflection effect by allowing external light to pass through the second retardation film 200 through linear polarization.

The polarizing plate 10 may have a reflectivity of about 0.5% or less on the front surface thereof. The polarizing plate 10 may have a reflectivity of about 1.0% or less, preferably about 0.8% or less, on the side surface thereof. Within this range, the polarizing plate can improve screen quality. The polarizing plate may have a difference of about 0.5% or less between the front reflectivity and the side reflectivity.

In one embodiment, the polarizing film 300 may include a polyvinyl alcohol-based polarizer formed by dyeing a polyvinyl alcohol film with iodine or a polyene-based polarizer formed by dehydrating a polyvinyl alcohol film. The polarizer may have a thickness of about 5 μm to about 50 μm. Within this range, the polarizing film can be used in the display device.

In another embodiment, the polarizing film may include the polarizer and a protective layer formed on one surface of the polarizer. The protective layer may include at least one selected from the group of an optically transparent protective film and an optically transparent protective coating layer.

The protective film may include a protective film formed of an optically transparent resin. The protective film may be formed by melting and extruding the resin. A stretching process may be further added, as needed. The resin may include at least one selected from the group of cellulose ester resins including triacetylcellulose (TAC), cyclic polyolefin resins including amorphous cyclic olefin polymer (COP), polycarbonate resins, polyester resins including polyethylene terephthalate (PET), polyether sulfone resins, polysulfone resins, polyamide resins, polyimide resins, non-cyclic polyolefin resins, polyacrylate resins including a poly(methyl methacrylate) resin, polyvinyl alcohol resins, polyvinyl chloride resins, and polyvinylidene chloride resins, without being limited thereto.

The protective coating layer can improve adhesion to the polarizer, transparency, mechanical strength, thermal stability, moisture blocking, and durability. In one embodiment, the protective coating layer may be formed of an actinic radiation-curable resin composition including an actinic radiation-curable compound and a polymerization initiator.

The protective layer may have a thickness of about 5 μm to about 200 μm, specifically about 30 μm to about 120 μm. Here, the protective film type protective layer may have a thickness of about 50 μm to about 100 μm and the protective coating layer type protective layer may have a thickness of about 5 μm to about 50 μm. Within this range, the polarizing plate including the protective layer may be used in the display device. The polarizing plate may further include functional coating layers, for example, a hard coating layer, an anti-fingerprint layer, an antireflection layer, and the like, on one or both surfaces of the protective layer.

A light emitting display device according to the present invention may include the polarizing plate for light emitting display devices according to the present invention. The light emitting display device may include a light emitting element. The light emitting element may include an organic light emitting element or an organic/inorganic light emitting element, and may refer to a light emitting diode (LED), an organic light emitting diode (OLED), a quantum dot light emitting diode (QLED), a light emitting element including a light emitting material such as phosphors, and the like. For example, the light emitting display device may include an organic light emitting diode display.

Next, the present invention will be described in more detail with reference to examples. However, it should be noted that these examples are provided for illustration only and should not be construed in any way as limiting the invention.

EXAMPLE 1

A liquid crystal retardation film (QLAA218, Fuji Film Co., Ltd.) includes a liquid crystal retardation layer formed on one surface of a TAC film (retardation-free film). The liquid crystal retardation layer has an Re of 240 nm, an Rth of −108 nm, and an NZ of 0.04 at a wavelength of 550 nm and includes discotic liquid crystals aligned in homeotropic alignment.

A composition for a nematic liquid crystal layer was prepared by dissolving 15 parts by weight of a liquid crystal polymer (MHZC-100A, Hayashi Telempu Co., Ltd.) in a solvent. The solvent included 70 parts by weight of a first solvent (THF, boiling point: 66° C.) and 30 parts by weight of a second solvent (EGM, boiling point: 124° C.).

The composition for the nematic liquid crystal layer was deposited on a base film (PET film) and dried under the following conditions. The first drying temperature and time, the second drying temperature and time, and the air velocity for drying were adjusted as listed in Table 1. Then, the dried composition was irradiated with linearly polarized UV light at 300 mJ by allowing UV light emitted from an LED lamp (600 W) to pass through a wire grid polarizer (WGP). Thereafter, the composition was heated at 130° C. and then cooled. Next, the composition was irradiated with UV light at 3 kW using a high pressure mercury lamp to form a nematic liquid crystal layer having a retardation value, as listed in Table 1. The nematic liquid crystal layer was formed without an alignment layer.

A polarizer was fabricated by stretching a polyvinyl alcohol film to three times an initial length thereof at 60° C., dyeing the stretched film with iodine, and stretching the dyed film again to 2.5 times the length of the dyed film in a boric acid solution at 40° C. A first protective layer (triacetylcellulose film, ZRG40SL, Fuji Film Co., Ltd.) was bonded to one surface of the polarizer via an epoxy-based UV adhesive for polarizing plates. A triacetylcellulose film (ZRG40SL, Fuji Film Co., Ltd.) was bonded to the other surface of the polarizer via an epoxy-based UV adhesive for polarizing plates, thereby preparing a polarizing film.

A liquid crystal retardation layer was separated from a liquid crystal retardation film (QLAA218, Fuji Film Co., Ltd.). The prepared polarizing film was attached to the separated liquid crystal retardation layer via a pressure sensitive adhesive (PSA) layer. In addition, the prepared nematic liquid crystal layer was attached to the other surface of the liquid crystal retardation layer via a PSA layer, thereby preparing a polarizing plate.

In the polarizing film, an angle defined between the absorption axis of the polarizer and the fast axis of the discotic liquid crystal layer was set to 18°. In the polarizing film, an angle defined between the absorption axis of the polarizer and the fast axis of the nematic liquid crystal layer was set to 78°.

EXAMPLES 2 and 3

Each polarizing plate was fabricated in the same manner as in Example 1 except that the kind of solvent, the drying temperature and time, and the wind velocity in formation of the nematic liquid crystal layer of the first retardation film were changed as listed in Table 1.

COMPARATIVE EXAMPLES 1 and 2

Each polarizing plate was fabricated in the same manner as in Example 1 except that the kind of solvent, the drying temperature and time, and the air velocity in formation of the nematic liquid crystal layer of the first retardation film were changed as listed in Table 1.

COMPARATIVE EXAMPLE 3

A polarizing plate was fabricated in the same manner as in Example 1 except that a nematic liquid crystal film (Re: 240 nm, NZ: 0.0) was used as the second retardation film.

COMPARATIVE EXAMPLE 4

A polarizing plate was fabricated in the same manner as in Example 1 except that a nematic liquid crystal film (Re: 240 nm, NZ: 0.5) was used as the second retardation film.

COMPARATIVE EXAMPLE 5

A polarizing plate was fabricated in the same manner as in Comparative Example 2 except that a nematic liquid crystal film (Re: 240 nm, NZ: 0.9) was used as the second retardation film.

Table 1 shows the compositions and fabrication conditions of the liquid crystal layers of the first retardation films used in Examples and Comparative Examples.

The polarizing plates prepared in Examples and Comparative Examples were evaluated as to the following properties and results are shown in Table 2.

Property Evaluation (1) Reflectivity: A specimen was prepared by forming an adhesive layer on the other surface of the nematic liquid crystal layer of each of the polarizing plates prepared in Examples and Comparative Examples and stacking the corresponding polarizing plate on a reflective panel via the adhesive layer. Front reflectivity (0°, 0°) was measured using a spectrophotometer (CM-3600d, Konica Minolta Inc.) under conditions of a light source D65 and a light reception part 10°. Side reflectivity (0°, 60°) was measured using a DMS (Instrument Systems Inc.).

(2) Side color shift (Δa*b*average @(0°, 60°)): A specimen was prepared by forming an adhesive layer on the other surface of the nematic liquid crystal layer of each of the polarizing plates prepared in Examples and Comparative Examples and stacking the corresponding polarizing plate on a reflective panel via the adhesive layer. Side color shift (0°, 60°) was measured on the specimen using an EZ contrast.

TABLE 1

| | Example | | | Comparative Example | | | | |
|---|---|---|---|---|---|---|---|---|
| | 1 | 2 | 3 | 1 | 2 | 3 | 4 | 5 |
| Liquid crystal | Nematic | Nematic | Nematic | Nematic | Nematic | Nematic | Nematic | Nematic |
| First solvent | THF | THF | THF | THF | THF | THF | THF | THF |
| Content of first solvent | 70 | 70 | 70 | 50 | 90 | 70 | 70 | 80 |
| Second solvent | EGM | EGM | EGM | EGM | EGM | EGM | EGM | EGM |
| Content of second solvent | 30 | 30 | 30 | 50 | 10 | 30 | 30 | 20 |
| First drying temp. (° C.) | 60 | 60 | 60 | 60 | 60 | 60 | 60 | 60 |
| First drying time (sec) | 60 | 60 | 60 | 60 | 60 | 60 | 60 | 60 |
| Second drying temp. (° C.) | 130 | 130 | 130 | 130 | 130 | 130 | 130 | 130 |
| Second drying time (sec) | 400 | 400 | 400 | 400 | 400 | 400 | 400 | 400 |
| Air velocity (m/s) | 6 | 4 | 8 | 6 | 6 | 6 | 6 | 6 |
| Re (nm) | 120 | 115 | 125 | 120 | 125 | 120 | 120 | 125 |
| NZ | 0.5 | 0.3 | 0.7 | 0.1 | 0.9 | 0.5 | 0.5 | 0.9 |

TABLE 2

| | | Example | | | Comparative Example | | | | |
|---|---|---|---|---|---|---|---|---|---|
| | | 1 | 2 | 3 | 1 | 2 | 3 | 4 | 5 |
| Second retardation film | Liquid crystal | Discotic | Discotic | Discotic | Discotic | Discotic | Nematic | Nematic | Nematic |
| | Re (nm) | 240 | 240 | 240 | 240 | 240 | 240 | 240 | 240 |
| | NZ | 0.04 | 0.04 | 0.04 | 0.04 | 0.04 | 0.0 | 0.5 | 0.9 |
| First retardation film | Liquid crystal | Nematic | Nematic | Nematic | Nematic | Nematic | Nematic | Nematic | Nematic |
| | Re (nm) | 120 | 115 | 125 | 120 | 125 | 120 | 120 | 125 |
| | NZ | 0.5 | 0.3 | 0.7 | 0.1 | 0.9 | 0.5 | 0.5 | 0.9 |
| Reflectivity (%) | Side surface | 0.72 | 0.74 | 0.74 | 0.9 | 1.1 | 1.1 | 0.9 | 1.2 |
| | Front surface | 0.33 | 0.34 | 0.34 | 0.34 | 0.35 | 0.35 | 0.34 | 0.35 |
| | Difference between side surface and front surface | 0.39 | 0.40 | 0.40 | 0.56 | 0.75 | 0.75 | 0.56 | 0.85 |
| | Side color shift | 3.4 | 3.6 | 3.6 | 4.5 | 4.9 | 4.9 | 4.5 | 5.0 |

Referring to Table 2, the polarizing plates according to the present invention could reduce both front reflectivity and side reflectivity at the same time, suppress side color shift, and a difference between the front reflectivity and the side reflectivity.

On the contrary, the polarizing plates of Comparative Examples 1 and 2 each including the first retardation film having an NZ not within the inventive range, the polarizing plate of Comparative Example 3 including the nematic liquid crystal as the second retardation film, the polarizing plate of Comparative Example 4 including the nematic liquid crystal as the second retardation film and the first retardation film having an NZ not within the inventive range, and the polarizing plate of Comparative Example 5 including the first retardation film and the second retardation film not satisfying the present invention had high side reflectivity and exhibited insignificant improvement in side color shift, and a high difference between the front reflectivity and the side reflectivity, as compared with the polarizing plates according to the present invention.

It should be understood that various modifications, changes, alterations, and equivalent embodiments can be made by those skilled in the art without departing from the spirit and scope of the present invention.

The invention claimed is:

1. A polarizing plate for light emitting display devices, comprising:
    a polarizing film; and
    a liquid crystal retardation film formed on one surface of the polarizing film, the liquid crystal retardation film comprising a laminate of a second retardation film and a first retardation film, the second retardation film comprising a discotic liquid crystal layer having an in-plane retardation Re of about 220 nm to about 280 nm and a degree of biaxiality NZ of about 0 to about 0.3 at a wavelength of 550 nm, the first retardation film comprising a nematic liquid crystal layer having an in-plane retardation Re of about 100 nm to about 150 nm and a degree of biaxiality NZ of about 0.3 to about 0.7 at a wavelength of 550 nm,
    wherein the nematic liquid crystal layer comprises photoreactive liquid crystals having a photosensitive functional group,
    wherein the nematic liquid crystal layer comprises a unit represented by Formula 1 or Formula 2:

<Formula 1>

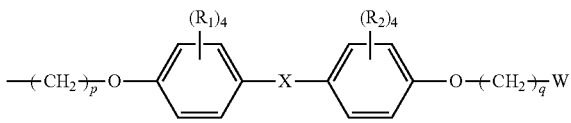

where p is an integer from 1 to 12; q is an integer from 0 to 12; X is a single bond, a $C_1$ to $C_{10}$ alkylene group, —O—, —S—, —SO—, —SO$_2$—, —CH=CH—, —C≡C—, —N=N—, —COO—, —OCO—, or a $C_6$ to $C_{10}$ arylene group; $R_1$ and $R_2$ are each independently a hydrogen atom, a $C_1$ to $C_{10}$ alkyl group, a $C_1$ to $C_{10}$ alkoxy group, a $C_2$ to $C_{10}$ alkenyl group, a $C_2$ to $C_{10}$ alkynyl group, or a halogen atom; and W is a cinnamoyl group, a cinnamylidene group, a (meth)acryloyl group, a (meth)acryloyl group-containing group, a coumarin group, or a benzophenone group, <Formula 2>

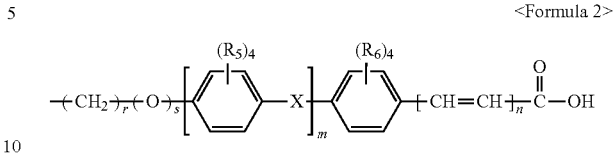

where r is an integer from 0 to 12; s is 0 or 1; m is 0 or 1; n is an integer from 1 to 3; X is a single bond, a $C_1$ to $C_{10}$ alkylene group, —O—, —S—, —SO—, —SO$_2$—, —CH=CH—, —C≡C—, —N=N—, —COO—, —OCO—, or a $C_6$ to $C_{10}$ arylene group; and $R_5$ and $R_6$ are each independently a hydrogen atom, a $C_1$ to $C_{10}$ alkyl group, a $C_1$ to $C_{10}$ alkoxy group, a $C_2$ to $C_{10}$ alkenyl group, a $C_2$ to $C_{10}$ alkynyl group, or a halogen atom.

2. The polarizing plate for light emitting display devices according to claim 1,
    wherein the photosensitive functional group comprises at least one selected from the group of a cinnamoyl group, a cinnamylidene group, a (meth)acryloyl group, the (meth)acryloyl group-containing group, a coumarin group, and a benzophenone group.

3. The polarizing plate for light emitting display devices according to claim 1, wherein the nematic liquid crystal layer is an alignment layer-free liquid crystal layer.

4. The polarizing plate for light emitting display devices according to claim 1, wherein the first retardation film has an out-of-plane retardation Rth of about −30 nm to about 30 nm at a wavelength of 550 nm.

5. The polarizing plate for light emitting display devices according to claim 1, wherein the discotic liquid crystal layer comprises liquid crystals free from a photosensitive functional group.

6. The polarizing plate for light emitting display devices according to claim 1, wherein the second retardation film has an out-of-plane retardation Rth of about −90 nm to about −140 nm at a wavelength of 550 nm.

7. The polarizing plate for light emitting display devices according to claim 1, wherein a difference in degree of biaxiality at a wavelength of 550 nm between the second retardation film and the first retardation film ranges from about 0.2 to about 0.8.

8. The polarizing plate for light emitting display devices according to claim 1, wherein an angle defined between a fast axis of the second retardation film and a fast axis of the first retardation film ranges from about 55° to about 80°.

9. The polarizing plate for light emitting display devices according to claim 1, wherein the first retardation film has a thickness of about 0.5 μm to about 2 μm.

10. The polarizing plate for light emitting display devices according to claim 1, further comprising: an adhesive layer between the first retardation film and the second retardation film.

11. The polarizing plate for light emitting display devices according to claim 1, wherein the polarizing plate has a front reflectivity of about 0.5% or less and a side reflectivity of about 1% or less.

12. A light emitting display device comprising the polarizing plate according to claim 1.

* * * * *